United States Patent [19]
Barnes et al.

[11] 4,105,645
[45] Aug. 8, 1978

[54] POLYMERIZATION OF 2-PYRROLIDONE WITH ALKALINE CATALYST AND SO₂ CHAIN INITIATOR

[75] Inventors: Arthur C. Barnes; Carl E. Barnes, both of New Canaan, Conn.

[73] Assignee: Barson Corp., New Canaan, Conn.

[21] Appl. No.: 718,410

[22] Filed: Aug. 30, 1976

[51] Int. Cl.² .............................................. C08G 69/24
[52] U.S. Cl. ................................... 528/313; 528/323; 528/314
[58] Field of Search ............................ 260/78 P, 78 L

[56] References Cited
U.S. PATENT DOCUMENTS 3,174,951  3/1965  Taber ................................. 260/78 P
3,681,294  8/1972  Jarovitzky ......................... 260/78 P
3,721,652  3/1973  Barnes ............................... 260/78 P Primary Examiner—Harold D. Anderson

[57] ABSTRACT

A method of forming white polymers of controlled molecular weight when polymerizing 2-pyrrolidone using an alkaline catalyst and sulfur dioxide as the chain initiator is disclosed. The temperature at which the polymerization is carried out is critical and is carefully controlled. The SO₂ which must also be controlled within limits is diluted with an inert gas to diminish its activity and make it easier to measure the small amounts involved. The viscosity and thermal stability of the polymers formed are as good as or better than those formed when CO₂ is used as the initiator.

15 Claims, 5 Drawing Figures

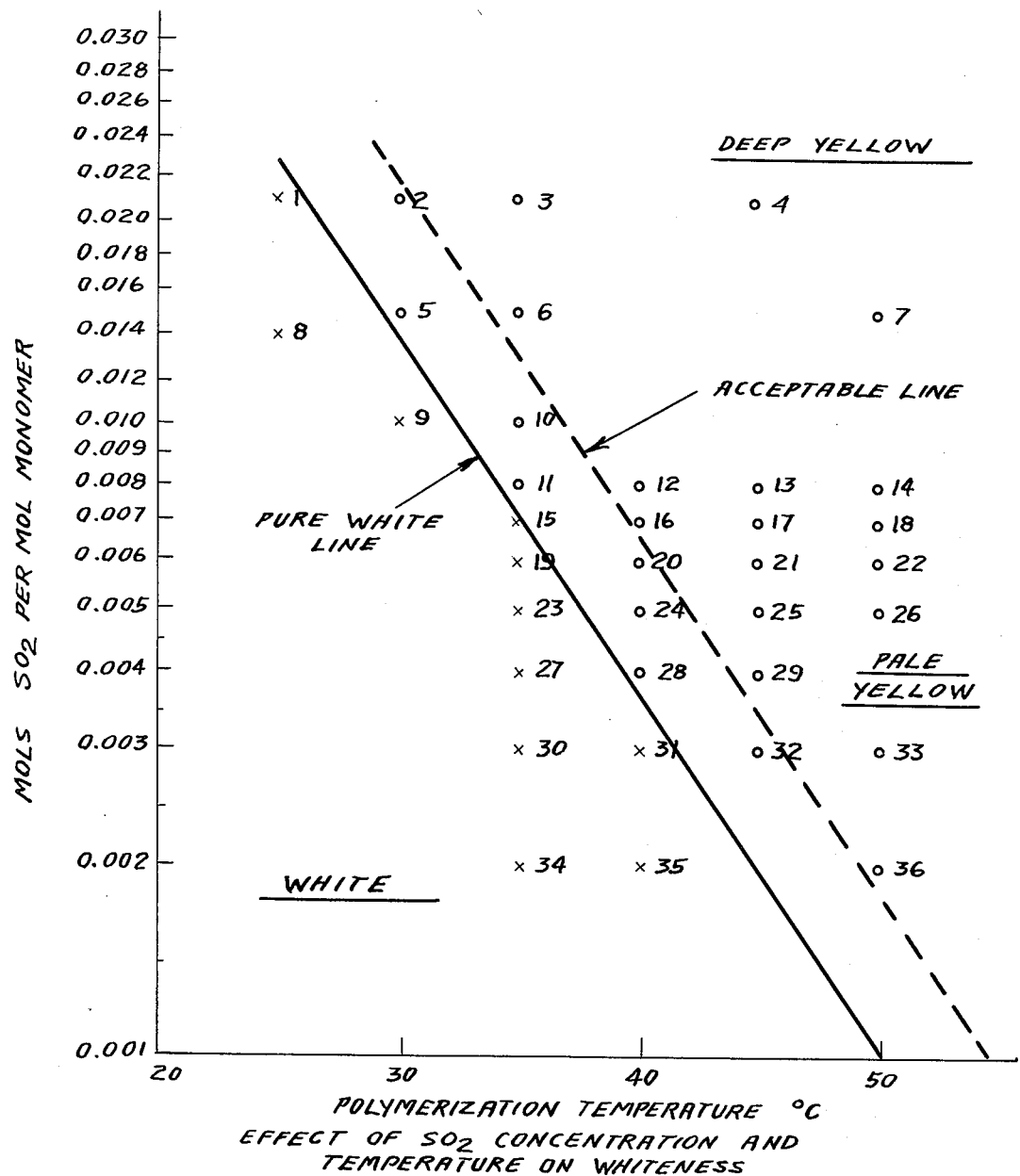

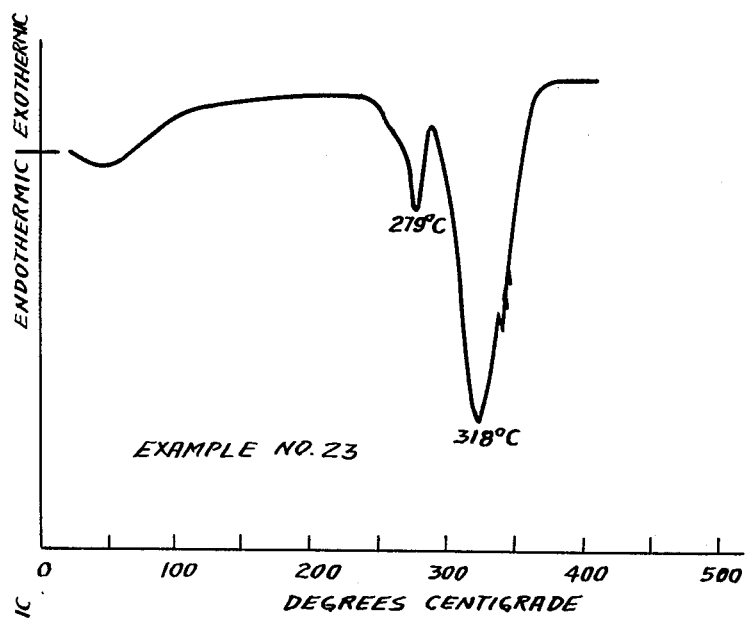
Fig. 2. EXAMPLE NO. 23
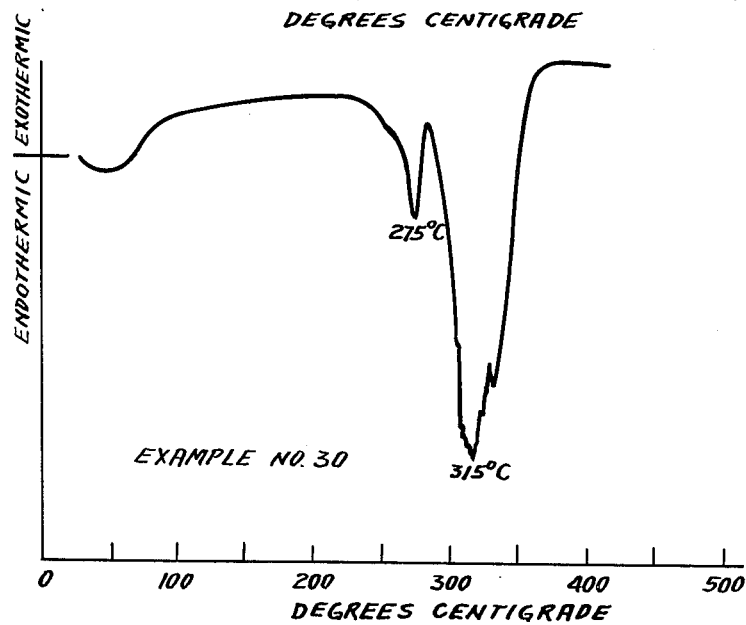
Fig. 3. EXAMPLE NO. 30
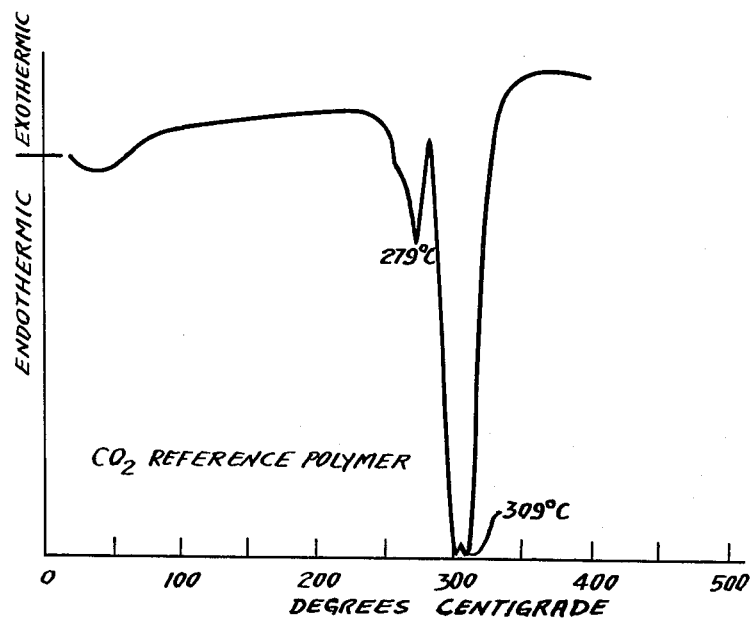
Fig. 4. $CO_2$ REFERENCE POLYMER

POLYMERIZATION OF 2-PYRROLIDONE WITH ALKALINE CATALYST AND SO₂ CHAIN INITIATOR

RELATED APPLICATIONS

This application is a continuation-in-part of our co-pending application Ser. No. 613,209 filed Sep. 15, 1975, now abandoned.

BACKGROUND OF THE INVENTION

This invention relates to the polymerization of 2-pyrrolidone and more particularly to the formation of polymers which have a useful molecular weight and are white in color when using sulfur dioxide as the chain initiator.

The formation of polymers of 2-pyrrolidone involving the use of alkaline catalysts via an anionic mechanism is disclosed in U.S. Pat. No. 2,638,463. Subsequent patents, for example U.S. Pat. No. 2,809,958, further disclose the need for an activator or co-catalyst to increase the yield of polymer formed.

Suitable alkaline catalysts are the oxides, hydroxides, alcoholates, hydrides, amides, etc. of the alkali metals, as well as the alkali metals themselves, which form the alkali metal salt of 2-pyrrolidone

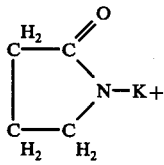

which is the actual catalyst.

The simplest, and most free from side reactions, are the alkali metal hydroxides, particularly sodium or potassium hydroxide. Quaternary ammonium hydroxides, as disclosed in U.S. Pat. No. 2,973,343, are also useful provided care is taken not to overheat the mixture during the preparation of the pyrrolidone salt which would destroy the thermally unstable quaternary base.

The polymer formed is believed to be a linear polyamide which has been called polypyrrolidone or nylon-4, having the structure:

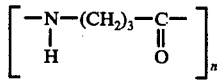

The value of $n$, or in other words, the molecular weight of the polymer, has been found to be dependent on the type of activator employed. The vast majority of activators or co-catalysts which have been disclosed in the prior art (for example those disclosed in U.S. Pat. Nos. 2,809,958; 3,060,153; and 3,069,392 result in a polymer of medium molecular weight having insufficient thermal stability to withstand the high temperatures required for melt extrusion processes, for example in the formation of textile fibers by melt spinning.

Only two of the numerous activators which have been disclosed are capable of forming polymers of 2-pyrrolidone which have markedly higher molecular weights and greatly increased thermal stabilities. One of these is carbon dioxide, disclosed in U.S. Pat. No. 3,721,652 and the other is sulfur dioxide, disclosed in U.S. Pat. No. 3,174,951. Polymers formed by using both $CO_2$ and $SO_2$ activators have been successfully melt spun into fibers (Gunter Schirawski, Die Makromolekulare Chemie, 161 (1972), page 67).

There is, however, one drawback to the polymers formed by the use of $SO_2$ as the chain initiator; they are either quite yellow or have a yellowish tint when made under conditions which have been regarded as optimum for yield and molecular weight. These yellow polymers are much less useful commercially than the white polymers formed via the $CO_2$ route.

In the original disclosure of $SO_2$ as a chain initiator in the polymerization of 2-pyrrolidone (example 1 of U.S. Pat. No. 3,174,951) only one concentration of $SO_2$ was tried and although this gave a polymer having a high molecular weight, it was obtained in a yield of only 13.6 o/o. Attempts to improve the yield by employing the customary 50° C polymerization temperature results in a product having a deep golden yellow color and a viscosity so low as to be useless for extrusion purposes of any kind.

Jarovitzky (U.S. Pat. No. 3,681,294) added a mixture of sodium sulfite and sodium bisulfite to the polymerization mixture in an effort to improve the yield without forming a yellow product. During the course of his work he also carried out some experiments without any additives. In his Table I he reports his findings as to color for both the wet and the dry polymers. We have found that differences in color are much more readily discernable in the wet polymer than in the dry polymer. For example, in Example 2a of U.S. Pat. No. 3,681,294 the wet, room temperature polymer is described as "light yellow" and the wet 50° C polymer as being "orange yellow", while both of these polymers are described as "white" when dry. The surface of the dried polymer is dull and scatters the light more and unless comparisons are made with a standard color reference, even quite yellow polymers may be classified as "white".

In our work we used a polymer prepared via $CO_2$ activation as a standard reference sample for determining the whiteness of the polymers made in Examples 1–38 (Table I). Polymers of 2-pyrrolidone made via $CO_2$ activation set a new standard for whiteness for nylon-4, being much whiter than those made using other activators and fully comparable with polyester in this respect.

Each sample in Examples 1–38 was compared side by side with the polymer made by the $CO_2$ route, both wet and dry. The wet samples only were reported since we found the color of the wet samples to be more discernable than the dry as mentioned above. Prior art observations of the whiteness of nylon-4 samples have been rather superficial in that no standard reference sample was employed. Visual comparisons side by side with a reference sample are very critical and even very slight differences in color can be readily detected even though it is not possible to assign a numerical value by this method. Great care was exercised by both of us in our whiteness determinations.

Of the examples in U.S. Pat. No. 3,681,294 without any additives, only one, namely, Example 4a in Table I, was classified as "white" when wet. In this example there was employed an $SO_2$ concentration of 0.0017 mols per mol of 2-pyrrolidone, but the yield of product even at a polymerization temperature of 50° C was only 4 o/o and the intrinsic viscosity of 1.7 was so low that the product could not be used in any melt extrusion process.

Schirawski, in the publication cited above, also studied the effect of various concentrations of $SO_2$ on the yield, viscosity and thermal stability of polymers formed by the use of $SO_2$ as the activator, without regard however, to the formation of colored polymer. In Table 7 on page 65 of his publication he finds that an $SO_2$ concentration of 0.017 mol per mol of 2-pyrrolidone gives both a maximum yield and a maximum viscosity but a poor thermal stability. Although he does not mention the color of the polymer formed in this experiment specifically, we have found that this concentration of $SO_2$ at 50° C does give a polymer which is yellow in color. On page 66 of his publication it is stated that the higher concentrations of $SO_2$ resulted in yellow-brown to yellow products.

It is an object of this invention to provide polymers of 2-pyrrolidone made by the use of $SO_2$ as the activator or chain initiator which are fully equivalent or superior to those made by the use of $CO_2$ in all respects including viscosity, color and thermal stability.

It is a further object of this invention to provide a method of controlling the viscosity of the polymeric product formed within critical limits.

It is a still further object of this invention to provide polymers of 2-pyrrolidone made by the use of $SO_2$ as the initiator which are as good as or better than those made via $CO_2$ initiation in all respects without the incorporation of any other active ingredients.

Other objects will be apparent in the detailed disclosure which follows.

SUMMARY OF THE INVENTION

We have found that polymeric 2-pyrrolidone can be made having a commercially useful molecular weight, thermal stability and color if the temperature at which the polymerization is carried out is carefully controlled within certain narrow limits and if the amount of $SO_2$ used is also kept within certain limits.

In repeating prior art experiments we have found that the accepted polymerization temperature of 50° C. invariably causes the formation of polymers having lower than desirable molecular weight and also having a yellow color which renders them unacceptable for use in forming textile fibers as well as for certain other commercial uses.

The effect of temperature and $SO_2$ concentration on both viscosity and color is shown in Table 1 below. It should be noted that for melt extrusion processes viscosities lower than about 4.0 Stokes are of little value since the molten polymer is so fluid that it tends to drip, especially if there is an appreciable hold-up time between the extruder and the spinning head.

BRIEF DESCRIPTION OF THE DRAWINGS

FIG. 1 is a graph showing the relationship of reaction temperature to $SO_2$ concentration as these factors affect the whiteness of the polymerized 2-pyrrolidone. The numbered points in the graph correspond to the example numbers of Table 1, below. The points marked with an X represent white polymer while those marked with an O represent yellowish or yellow polymers. The "Acceptable" and "Pure White" lines are approximations drawn from the data of Table I.

FIGS. 2, 3 and 4 are Differential Thermal Analysis (DTA) curves made on a Robert L. Stone controlled environment instrument model LA-XYH. An inert atmosphere was provided by a stream of nitrogen flowing at a rate of 40cc per minute at atmospheric pressure and the previously vacuum dried samples were heated at the rate of 10° C per minute. The endothermic and exothermic areas on each Figure denote the absorption or giving off of heat energy from the polymer as it is heated.

FIG. 2 is the curve obtained from Example No. 23 in Table I;

FIG. 3 is the curve from Sample No. 30 in Table I; and

FIG. 4 is the curve from a reference polymer made via $CO_2$ as the activator.

DETAILED DESCRIPTION OF A PREFERRED EMBODIMENT

Figure 5:
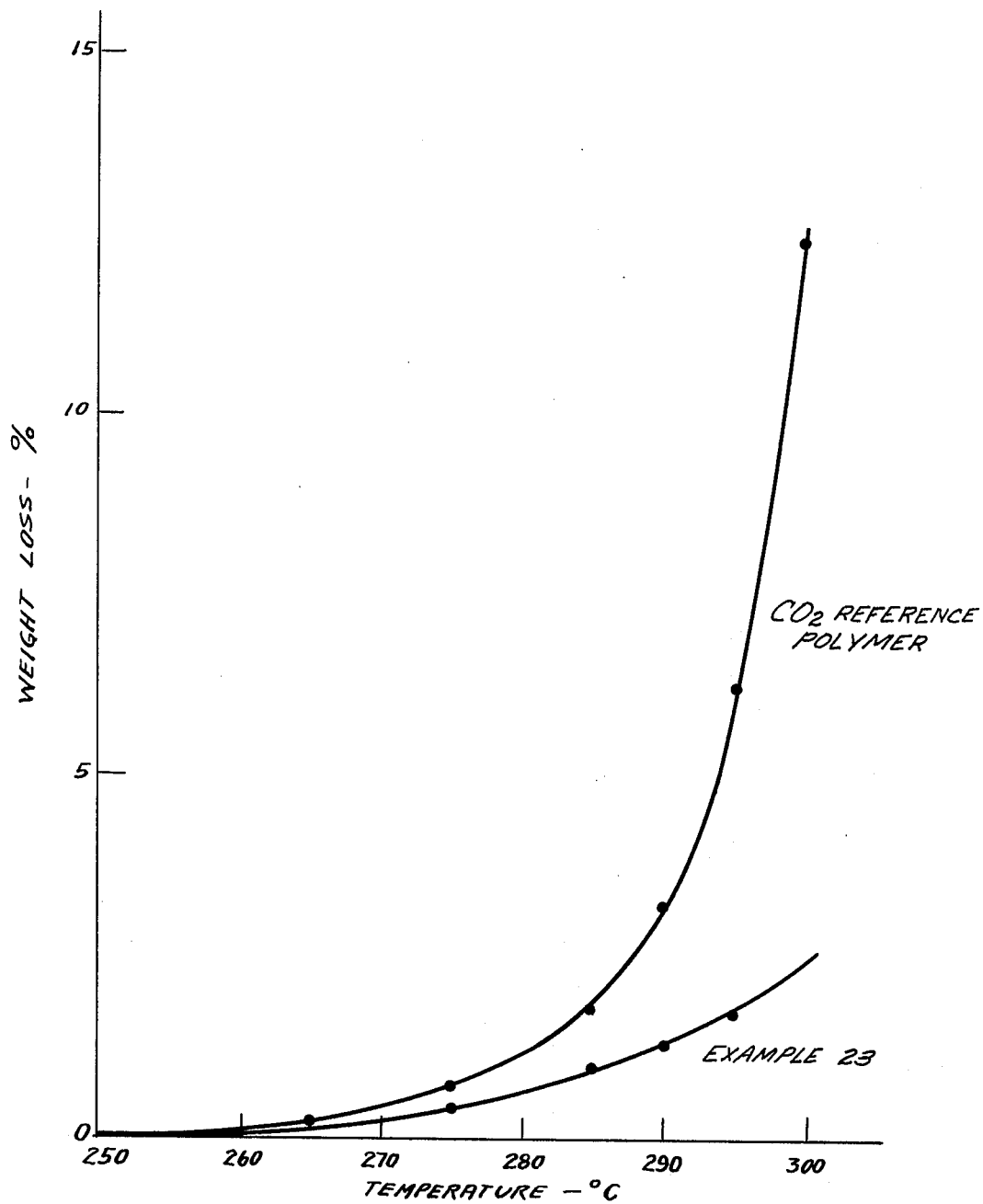
FIG. 5 is a comparison of curves obtained by thermogravimetric analysis (TGA) of a previously dried sample from Example No. 23 and the $CO_2$ reference polymer. The instrument used was a DuPont thermogravimetric analyzer and the samples were heated under nitrogen at a flow rate of 40cc per minute and at a temperature rise of 10° C per minute. The samples for both the DTA and TGA determinations were dried for one hour at 110° C in a vacuum oven.

We have found that, unlike $CO_2$ which forms a white polymer under a wide range of concentrations as well as a useful viscosity and thermal stability without critical control of the concentration, $SO_2$, perhaps because it is much more active, must be controlled within very narrow limits if a useful product is to be formed. In order to facilitate the measuring of the critical concentrations which must be employed, we have found it useful to work with dilute mixtures of $SO_2$ with an inert gas such as nitrogen. Diluted in this way $SO_2$ can be introduced into the reaction with enough control to prevent an excess or deficiency. In the examples which follow an $SO_2$ concentration in the range of about 0.5 to 10% in dry nitrogen was employed although other concentrations may be used.

For the primary catalyst, either sodium or potassium hydroxide in a concentration of from 0.01 mol to 0.1 mol per mol of 2-pyrrolidone is preferred. Optimum polymerization rates are obtained at concentrations of from 0.02 to 0.06 mols of primary catalyst per mol of 2-pyrrolidone. In certain instances a quaternary ammonium hydroxide may be used in place of the alkali metal hydroxide.

For the secondary catalyst, or polymerization activator, sulfur dioxide is employed. We have found that in order to form polymers having acceptable color and viscosity when using this activator it is essential to use polymerization temperatures substantially lower than 50° C. but, in order to achieve practical conversion rates, higher than room temperature.

A preferred temperature range is from 30 and 45° C. and when operating within these temperature limits the $SO_2$ concentration should be not more than 0.024 and 0.004 mols per mol of 2-pyrrolidone, respectively. A more preferred temperature range is between 30° and 40° C. in which case the upper limits of the $SO_2$ concentration are 0.024 and 0.007 mols per mol of 2-pyrrolidone respectively. Most preferably a temperature range of between 32° and 38° C. is employed, the upper limits of the $SO_2$ concentration then being 0.018 and 0.008 mols per mol of 2-pyrrolidone respectively, with the most preferred upper limits being 0.01 and 0.005 mols respectively in order to obtain the whitest polymer and generally higher viscosities.

The preferred conditions are more clearly set forth in FIG. 1 wherein the maximum allowable $SO_2$ concentrations which may be used for a given temperature within the preferred temperature range is plotted as a dotted straight line drawn on a semi-log graph having a logarithmic scale of $SO_2$ concentrations along the ordinate in terms of mols of $SO_2$ per mol of 2-pyrrolidone monomer and having the temperature at which the polymerization is carried out along the abscissa. This dotted line represents limits which allow the formation of polymer having generally acceptable color and is drawn from the vicinity of the point at 30° C. temperature and 0.024 mols of $SO_2$ concentration to the vicinity of the point at 45° C. temperature and about 0.004 mols of $SO_2$ concentration.

The more preferred conditions which result in white polymer and generally higher viscosities is represented in FIG. 1 as a solid line. The limits in this instance are about 0.014 mols of $SO_2$ per mol of 2-pyrrolidone at a temperature of 30° C. and about 0.004 mols of $SO_2$ per mol of 2-pyrrolidone at 40° C. and this line is drawn between points in the vicinity of these positions. The lines are marked "Acceptable" and "Pure White", referring to the color of the polymer formed, and are approximations drawn in the best positions between the various points on the graph and are not to be regarded as absolute. They set forth generally the latitude within which one may operate to obtain polymer having the desired color. Likewise Table I shows the latitude within which one may operate to obtain a polymer having a desired viscosity.

When operating within the above temperature ranges it is important to select a temperature within the range and maintain this temperature within narrow limits. Fluctuations in the polymerization temperature within a batch will cause broadening in the molecular weight distribution within the sample while fluctuations in temperature between batches will result in batch to batch differences in viscosity which in turn will require changes in temperature and pressure settings in the melt extruder making continuous operation of the extruder difficult if not impossible. This is equally true when $CO_2$ is used as the activator. The polymerization temperature should be constant within plus or minus 2° C. and preferably within plus or minus 1° C. to provide for uniform viscosity of the polymer within each batch and from batch to batch. Since the polymerization of 2-pyrrolidone is somewhat exothermic, a means of absorbing the heat evolved must be provided especially in larger batches if the polymerization temperature is to be adequately controled. A stirred reactor with means for absorbing the heat evolved should be used to maintain a substantially constant temperature throughout the batch.

EXAMPLES 1-38

100 grams of 2-pyrrolidone purified by recrystallization was added to a 500 ml 3-necked flask equipped with a gas inlet tube, a thermometer for measuring pot temperature and a distillation head bearing a thermometer for measuring vapor temperature and a receiver having a vacuum connection. To this was then added 3.3 grams (0.05 mol) of potassium hydroxide (85% assay). The system was then swept with nitrogen, evacuated to a pressure of about 10–15 mm of mercury, and the liquid warmed gently to help form the potassium salt of 2-pyrrolidone. The water formed as the result of this reaction was removed by further heating, and to insure dryness, 15 grams of pyrrolidone was distilled over, leaving 85 grams or 1 mol of pyrrolidone. The water white contents of the flask was then cooled to about 25° C and the $SO_2$ diluted with nitrogen was admitted through the gas inlet tube in the quantity indicated for each example in Table I.

In the polymerization apparatus Tygon tubing was used, since it does not react with $SO_2$.

After the addition of the $SO_2$, the syrupy liquid was poured into a polyethylene polymerization bottle, capped and then placed in a polymerization oven at the temperatures indicated for each example in Table I for the period of time also indicated. At the end of this time the color of the polymer cake was noted and the polymer was further treated with water in a Waring Blender to reduce the particle size so as to facilitate the removal of alkali and unpolymerized monomer. The polymer was then further washed several times with water and the color of the wet polymer noted. The polymer in each example was then dried and both the percentage of conversion and the viscosity determined.

The viscosity measurements were made using a 5.0% solution of the polymer in 85% formic acid. When the polymer had completely dissolved, the solution was poured into an empty Gardner Bubble Viscometer tube for comparison at 25° C with the bubble flow of Gardner No. VG-7375 standard bubble tubes. Some of the higher viscosities required the use of the Gardner VG-7380 series of tubes. These tubes are calibrated in Stokes and the viscosity values reported in Table I below are accordingly set forth on the Stokes scale.

Upon examining Table I of our earlier application, Serial No. 613,209 filed September 15, 1975, Example No. 18 seemed to be much too high in viscosity since this was the only sample formed at 50° C. which did not have a low viscosity. Thus Example No. 14, having 0.008 mols of $SO_2$ per mol of 2-pyrrolidone and polymerized at 50° C. had a viscosity of 3.0 Stokes and Example No. 22 having 0.006 mols of $SO_2$ and polymerized at 50° C. also had a viscosity of 3.0. Considering these facts it appeared that an error might have occurred in the viscosity measurement of the polymer formed in Example No. 18. Accordingly this sample was run over again and it was found that an error had, in fact, been made. The viscosity was now found to be 3.3 Stokes and it is so listed in the Table I of this application.

TABLE I

| EXAMPLE NO. | POLYMERIZATION TEMP. ° C. | TIME HRS. | MOLS. $SO_2$ | COLOR POLYMER CAKE | CONVERSION % | VISCOSITY (STOKES) | COLOR WET POLYMER |
|---|---|---|---|---|---|---|---|
| 1 | 25 | 48 | 0.02 | Very Pale Buff | 30 | 6.3 | Snow White |
| 2 | 30 | 48 | 0.02 | Pale Buff | 51 | 6.3 | Cream |
| 3 | 35 | 48 | 0.02 | Yellow Buff | 61.5 | 5.0 | Light Yellow |
| 4 | 45 | 48 | 0.02 | Dark Buff Orange | 75 | 1.4 | Golden Yellow |
| 5 | 30 | 30 | 0.015 | Very Slight Buff | 34 | 9.0 | White Buff Tint |
| 6 | 35 | 30 | 0.015 | Cream | 47 | 6.3 | Very Pale Yellow |
| 7 | 50 | 30 | 0.015 | Dark Tan | 70 | 1.4 | Golden Yellow |
| 8 | 25 | 48 | 0.014 | White | 45 | 6.3 | Snow-White |

TABLE I-continued

| EXAMPLE NO. | POLYMERIZATION TEMP. °C. | TIME HRS. | MOLS. SO$_2$ | COLOR POLYMER CAKE | CONVERSION % | VISCOSITY (STOKES) | COLOR WET POLYMER |
|---|---|---|---|---|---|---|---|
| 9 | 30 | 30 | 0.01 | White | 43 | 10.0 | Snow-White |
| 10 | 35 | 30 | 0.01 | Buff Tint | 46 | 7.6 | White Buff Tint |
| 11 | 35 | 30 | 0.008 | Cream Tan Tint | 67 | 9.0 | White Tan Tint |
| 12 | 40 | 30 | 0.008 | Pale Tan | 76 | 4.4 | Light Brownish Yellow |
| 13 | 45 | 30 | 0.008 | Tan | 79 | 3.7 | Brownish Yellow |
| 14 | 50 | 30 | 0.008 | Tan | 79 | 3.0 | Clear Yellow |
| 15 | 35 | 30 | 0.007 | Very Pale Cream | 57 | 10.0 | White |
| 16 | 40 | 30 | 0.007 | Cream | 62 | 9.0 | Cream |
| 17 | 45 | 30 | 0.007 | Cream-Yellow Cast | 72 | 9.0 | Ivory |
| 18 | 50 | 30 | 0.007 | Light Buff | 75 | 3.3 | Lemon Yellow |
| 19 | 35 | 30 | 0.006 | Pale Cream | 62 | 10.0 | White |
| 20 | 40 | 30 | 0.006 | Cream | 67 | 4.4 | Ivory |
| 21 | 45 | 30 | 0.006 | Light Buff | 72 | 3.2 | Pale Yellow |
| 22 | 50 | 30 | 0.006 | Light Tan | 77 | 3.0 | Light Yellow |
| 23 | 35 | 30 | 0.005 | White | 50 | 6.3 | Snow-White |
| 24 | 40 | 30 | 0.005 | Cream | 62 | 5.5 | Off-White |
| 25 | 45 | 30 | 0.005 | Pale Tan | 61 | 4.4 | Light Cream |
| 26 | 50 | 30 | 0.005 | Light Tan | 64 | 3.7 | Ivory |
| 27 | 35 | 30 | 0.004 | Pure White | 59 | 6.3 | Snow White |
| 28 | 40 | 30 | 0.004 | Pale Cream | 72 | 6.3 | Off-White |
| 29 | 45 | 30 | 0.004 | Cream | 70 | 5.5 | Cream |
| 30 | 35 | 30 | 0.003 | Snow-White | 41 | 11.0 | Snow-White |
| 31 | 40 | 30 | 0.003 | Pure White | 49 | 10.0 | Snow-White |
| 32 | 45 | 30 | 0.003 | Off-White | 60 | 9.0 | Pale Cream |
| 33 | 50 | 30 | 0.003 | Pale Buff | 60 | 4.4 | Cream |
| 34 | 35 | 30 | 0.002 | White | 46 | 6.3 | Snow-White |
| 35 | 45 | 30 | 0.002 | White | 48 | 4.4 | Snow-White |
| 36 | 50 | 30 | 0.002 | Pale Cream | 50 | 3.0 | Cream |
| 37 | 45 | 40 | 0.0003 | White | 12 | Very Low | Snow-White |
| 38 | 50 | 40 | 0.0003 | White | 13 | Very Low | Snow-White |

From the above Table it will be observed that at a polymerization temperature of 50° C as disclosed in the prior art, white polymers are not produced except at concentrations of SO$_2$ which are so low that the yield is uneconomical and even then the molecular weight (viscosity) of the product is unsatisfactory. Polymerization at room temperature likewise results in conversions which are so low as to be impractical.

It will also be observed from an examination of Table I that not only is the whiteness of the polymer formed dependent on the temperature at which the polymerization is carried out, but so is the viscosity. In Examples 11–14 the viscosity may be observed to drop from a value of 9.0 to 3.0 Stokes as the polymerization temperature was raised from 30° to 50° C. Similarly, in Examples 19–22, the viscosity of the polymer formed dropped from 10.0 to 3.0 Stokes as the temperature was raised to 50° C. This same pattern can be observed throughout Table I.

Further examination of Table I will show that, as observed in the prior art, the concentration of SO$_2$ employed also affects the viscosity of the polymer formed. But it is also apparent that this factor is not nearly as critical as is the polymerization temperature. Thus, by comparing Example 33 with Example 7, it is seen that at 50° C a five-fold increase in the SO$_2$ concentration caused a drop in viscosity from 4.4 to 1.4 Stokes. By comparing Example 35 with Example 4, it may be observed that at 45° C it required a ten-fold increase in the SO$_2$ concentration to effect a similar drop in viscosity. Finally, by comparing Example 34 with Example 3, it is clear that at a polymerization temperature of 35° C a ten-fold increase in the SO$_2$ concentration resulted in only a relatively minor change in viscosity from 6.3 to 5.0 Stokes. Therefore, it may be concluded that the temperature at which the polymerization is carried out is a much more critical factor in determining both viscosity and whiteness than is the SO$_2$ concentration. It may also be concluded that in order to insure uniform maintenance of viscosities from batch to batch, the polymerization temperature must be very accurately controlled.

The preparation of the salt of 2-pyrrolidone may be carried out as in examples 1–38 with tetramethyl ammonium hydroxide being employed as the primary catalyst instead of potassium hydroxide. Extra care must be taken to insure a good vaccum and to distill off the 2-pyrrolidone during the drying operation at the lowest possible temperature, in any case not to exceed a pot temperature of 90° C, so as not to decompose the tetramethyl ammonium hydroxide catalyst. The remainder of the operation is carried out as in example 1.

In carrying out the above described polymerization for certain industrial end-uses, it may be desirable to incorporate certain inert substances such as titanium dioxide (as a dulling agent) or other materials to provide increased stability in the finished product toward ultraviolet light. While such substances may be mixed with the finished polymer before extruding, it is much more satisfactory in order to achieve better dispersion to incorporate them in the monomer catalyst mix just before polymerizing. In accordance with this invention, such substances are considered inert or inactive since they have no effect on the inherent whiteness, the viscosity or the yield of the resulting polymer.

To illustrate the thermal stability of polymers prepared under the strict conditions employed in the foregoing examples, samples of the polymers obtained from examples 20, 27 and 30 were placed in small vials and the air removed by applying a vacuum and breaking the vacuum with nitrogen gas repeating the operation four times. A sample of the reference polymer prepared via CO$_2$ as the chain initiator was placed in a similar vial and the air replaced by nitrogen in the identical manner. All four vials were placed side by side in an oven maintained at 200° C for 1 hour. At the end of this time all the polymers had developed a pale brown or tan color and there was no discernable difference in color between any of the samples.

Additional information as to the thermal stability of the white polymers prepared as described herein was obtained by both Differential Thermal Analysis (DTA) and by Thermogravimetric Analysis (TGA). FIGS. 2, 3 and 4 are DTA curves obtained from samples taken from Examples No. 23 and No. 30 in Table I, and the $CO_2$ reference polymer, respectively.

It will be observed that both the $CO_2$ polymer and the $SO_2$ polymers exhibit a sharp melting endotherm which peaks at about 275° C within the experimental error of the instrument. The slight shoulder observed on each of the curves as the sample starts to absorb heat is probably due to the release of the last traces of moisture which is tenaciously held by nylon-4. The true melting of the polymer starts just after this shoulder at 265° C, which is the accepted melting temperature of polypyrrolidone.

It will also be observed that although both the $CO_2$ polymer (FIG. 4) and the $SO_2$ polymers (FIGS. 2 and 3) begin to depolymerize at about the same temperature, the $SO_2$ polymers do so at a slower rate and over a wider temperature range. For example, the peak of the depolymerization endotherm for the $CO_2$ polymer (FIG. 4) occurs at about 309° C or 30° higher than the melting endotherm which occurs at about 279° C, whereas the peak of the depolymerization endotherm for the $SO_2$ polymer in FIG. 2 occurs at about 318° C or 39° higher than the melting endotherm which is about at 279° C. Similarly, the peak of the depolymerization endotherm in FIG. 3 occurs at about 315° C which is 40° higher than the peak of the melting endotherm which is about at 275° C.

The critical depolymerization rates in the melt spinning process are those just after the polymer melts and for a short time thereafter until it passes through the extrusion head and spinnerette to form filaments which are then cooled rapidly in the quenching step. During this melt extrusion operation the polymer can attain temperatures of up to 290° or even 300° C as the result of the heat generated by the mechanical action of the screw on the viscous molten polymer in the extruder.

It is readily apparent from a comparison of FIGS. 2 and 3 with FIG. 4 that at 290° C the depolymerization of the $CO_2$ initiated polymer has proceeded much further than that of the $SO_2$ initiated polymers, and at 300° C it is even more pronounced. This is also shown clearly in FIG. 5 in which weight loss measurements as determined by TGA for the $SO_2$ polymer of Example No. 23 in Table I are compared with those of the $CO_2$ reference polymer within the critical area of 275° to 300° C.

The portion of the curve from 250° to 265° C again is believed to represent the loss of tightly bound water and corresponds to the shoulder in the DTA curves. True melting of the polymers does not start until 265° C. At about 275° C, when the samples are completely melted, the difference in the rate of depolymerization between the $SO_2$ initiated sample and the $CO_2$ initiated sample is already apparent. As the temperature is raised the difference in the rates of depolymerization becomes more and more pronounced. Since this difference in rates occurs within the temperature range in which melt spinning must be carried out, it is of great importance. Conditions in the extruder are extremely sensitive to small amounts of monomer and even a slight decrease in monomer formation can have a pronounced effect on the spinning characteristics of the polymer.

Thus, the process of our invention provides a white polymer of 2-pyrrolidone having characteristics similar or superior to polymeric 2-pyrrolidone made by the $CO_2$ process. The 2-pyrrolidone polymer made in accordance with the invention has very good thermal stability and viscosity and can be processed in a number of ways, including melt spinning, melt extrusion to form a film, injection or compression molding to form shaped articles or conversion by suitable processes into a pulp resembling wood pulp. Further, our process can be controlled by dilution of the $SO_2$ with nitrogen to maintain the $SO_2$ concentration within the required narrow limits to produce a white polymer.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

What is claimed is:

1. A process for the polymerization of 2-pyrrolidone comprising the polymerization of substantially anhydrous monomeric 2-pyrrolidone at a temperature of from 30° to 45° C. in the presence of a primary catalyst and an activator consisting essentially of sulfur dioxide, the concentration of sulfur dioxide varying with the temperature used and not exceeding a sulfur dioxide concentration bounded by an approximate straight line drawn on a semi-log graph having a logarithmic scale of sulfur dioxide concentration along the ordinate in terms of mols of sulfur dioxide per mol of 2-pyrrolidone monomer and having polymerization temperature along the abscissa, said line being drawn on said graph from the vicinity of the point at 30° C. temperature and 0.024 mols of sulfur dioxide per mol of monomer to the vicinity of the point at 45° C. temperature and 0.004 mols of sulfur dioxide per mol of monomer, the sulfur dioxide concentration being at least about 0.002 mols of sulfur dioxide per mol of pyrrolidone monomer with the polymerization taking place at a substantially constant temperature, whereby the polypyrrolidone formed is of a viscosity capable of being melt spun.

2. The process defined in claim 1 wherein the temperature of polymerization is between 30° and 40° C.

3. The process of claim 1 wherein the polymerization temperature is between 32° and 38° C.

4. The process of claim 1 wherein the polymerization temperature is maintained at a substantially constant temperature between 30° and 45° C.

5. The process of claim 1 wherein the polymerization temperature is controlled within plus or minus 2° C.

6. The process of claim 1 wherein the polymerization temperature is controlled within plus or minus 1° C.

7. The process of claim 1 wherein the sulfur dioxide is introduced as a dilute mixture with an inert gas.

8. The process of claim 1 wherein the sulfur dioxide is introduced as a dilute mixture with nitrogen.

9. A process for the polymerization of 2-pyrrolidone comprising the steps of contacting monomeric 2-pyrrolidone with a compound selected from the group consisting of an alkali metal hydroxide, a quaternary ammonium hydroxide, and an alkali metal alcoholate, removing the water formed or the alcohol formed in the reaction to yield a substantially anhydrous solution of the corresponding salt of 2-pyrrolidone as the primary catalyst in 2-pyrrolidone, contacting the mixture with an activator consisting essentially of sulfur dioxide and carrying out the polymerization at a temperature between 30° and 45° C., the concentration of sulfur dioxide varying with the temperature used and not exceeding a sulfur dioxide concentration bounded by an approximate straight line drawn on a semi-log graph having a logarithmic scale of sulfur dioxide concentration along the ordinate in terms of mols of sulfur dioxide per mol of 2-pyrrolidone monomer and having polymerization temperature along the abscissa, said line being drawn on said graph from the vicinity of the point at 30° C. temperature and 0.024 mols of sulfur dioxide per mol of monomer to the vicinity of the point at 45° C. temperature and 0.004 mols of sulfur dioxide per mol of monomer, the sulfur dioxide concentration being at least about 0.002 mols per mol of pyrrolidone monomer, the polymerization of pyrrolidone taking place at a substantially constant temperature, whereby the polypyrrolidone formed is of a viscosity capable of being melt spun.

10. The process of claim 9 wherein the polymerization temperature is between 30° and 40° C. and the amount of sulfur dioxide is from 0.024 to 0.007 mols per mol of 2-pyrrolidone.

11. The process of claim 9 wherein the polymerization temperature is between 32° and 38° C. and the amount of sulfur dioxide employed is from 0.018 to 0.008 mols per mol of 2-pyrrolidone.

12. The process of claim 9 wherein the polymerization temperature is maintained at a substantially constant temperature between 30° and 45° C.

13. The process of claim 12 wherein the temperature is controlled within plus or minus 1° C.

14. The process of claim 9 wherein the amount of sulfur dioxide is not more than that which would result in a substantially non-white polymer at the polymerization temperature employed.

15. A process for the polymerization of 2-pyrrolidone comprising the polymerization of substantially anhydrous monomeric 2-pyrrolidone at a temperature of from 30° to 45° C. in the presence of a primary catalyst and an activator consisting essentially of sulfur dioxide, said temperature being maintained at a substantially constant temperature within plus or minus 2° C., the concentration of sulfur dioxide varying with the temperature used and not exceeding a sulfur dioxide concentration bounded by an approximate straight line drawn on a semi-log graph having a logarithmic scale of sulfur dioxide concentration along the ordinate in terms of mols of sulfur dioxide per mol of 2-pyrrolidone monomer and having polymerization temperature along the abscissa, said line being drawn on said graph from the vicinity of the point at 30° C. temperature and 0.024 mols of sulfur dioxide per mol of monomer to the vicinity of the point at 45° C. temperature and 0.004 mols of sulfur dioxide per mol of monomer, the sulfur dioxide concentration being at least about 0.002 mols per mol of pyrrolidone monomer, whereby the polypyrrolidone formed is of a viscosity capable of being melt spun.

* * * * *